(12) United States Patent
Reupke et al.

(10) Patent No.: US 12,457,941 B2
(45) Date of Patent: Nov. 4, 2025

(54) DISPLACEABLE WRAPPING MATERIAL SUPPLY UNIT FOR BALING APPARATUS

(71) Applicant: AGCO International GmbH, Neuhausen (CH)

(72) Inventors: Harald Reupke, Wolfenbuttel (DE); Malte Cornelius Schlichting, Wolfenbuttel (DE); Jürgen Borchers, Wolfenbuttel (DE); Christian Adam, Wolfenbuttel (DE)

(73) Assignee: AGCO International GmbH, Neuhausen (CH)

( * ) Notice: Subject to any disclaimer, the term of this patent is extended or adjusted under 35 U.S.C. 154(b) by 807 days.

(21) Appl. No.: 17/662,640

(22) Filed: May 9, 2022

(65) Prior Publication Data
US 2022/0354060 A1    Nov. 10, 2022

(30) Foreign Application Priority Data
May 10, 2021    (GB) ...................................... 2106635

(51) Int. Cl.
*A01F 15/07*    (2006.01)
(52) U.S. Cl.
CPC ................................ *A01F 15/0715* (2013.01)
(58) Field of Classification Search
CPC ............................. A01F 15/0715; A01F 15/07
See application file for complete search history.

(56) References Cited

U.S. PATENT DOCUMENTS

| | | | | |
|---|---|---|---|---|
| 4,956,968 A | * | 9/1990 | Underhill ............ | A01F 15/0715 53/118 |
| 5,129,207 A | * | 7/1992 | Butler ................. | A01F 15/0715 53/118 |
| 5,129,208 A | * | 7/1992 | Van Zee ............. | A01F 15/0715 53/118 |
| 5,243,806 A | * | 9/1993 | Jennings ............. | A01F 15/0715 53/118 |
| 5,259,167 A | * | 11/1993 | Underhill ............ | A01F 15/0715 53/118 |

(Continued)

FOREIGN PATENT DOCUMENTS

| | | | | |
|---|---|---|---|---|
| EP | 0965263 A1 | * | 6/1999 | ......... A01F 15/0715 |
| EP | 2014150 A1 | | 1/2009 | |

(Continued)

OTHER PUBLICATIONS

UK Intellectual Property Office, Search Report for UK Priority Application No. GB2106635.2, dated Nov. 10, 2021.

(Continued)

*Primary Examiner* — Arpad Fabian-Kovacs

(57) ABSTRACT

A wrapping material supply apparatus for supplying wrapping material to a wrapper inlet of a baling chamber, in which a bale is to be wrapped. The wrapping material supply apparatus includes a wrapping material supply unit displaceable between a baling position and a wrapping position by a first actuator, and a cutting apparatus located at a lower end of the wrapping material supply apparatus. Movement of the wrapping material supply apparatus between the baling position and the wrapping position is independent of the movement of the cutting apparatus.

12 Claims, 4 Drawing Sheets

(56) References Cited

U.S. PATENT DOCUMENTS

| | | | | |
|---|---|---|---|---|
| 5,289,672 | A * | 3/1994 | Underhill | A01F 15/0715 53/389.3 |
| 5,687,548 | A * | 11/1997 | McClure | A01F 15/0715 53/118 |
| 6,050,052 | A * | 4/2000 | Herron | A01F 15/0715 53/118 |
| 6,209,450 | B1 * | 4/2001 | Naaktgeboren | A01F 15/141 56/341 |
| 6,453,805 | B1 * | 9/2002 | Viaud | A01F 15/0715 100/88 |
| 7,644,563 | B2 | 1/2010 | De Gersem | |
| 8,601,770 | B2 * | 12/2013 | Paillet | A01F 15/0715 53/389.3 |
| 10,375,893 | B2 * | 8/2019 | Rosseel | B65B 11/04 |
| 10,517,221 | B2 | 12/2019 | Thoreson et al. | |
| 10,624,270 | B2 | 4/2020 | Gresset | |
| 2004/0016204 | A1 | 1/2004 | Chow et al. | |
| 2007/0157556 | A1 | 7/2007 | Feraboli et al. | |
| 2008/0098692 | A1 * | 5/2008 | Paillet | A01F 15/0715 53/211 |
| 2008/0282662 | A1 * | 11/2008 | Viaud | A01F 15/0715 56/341 |
| 2009/0272072 | A1 | 11/2009 | Paillet et al. | |
| 2009/0282788 | A1 | 11/2009 | McClure | |
| 2010/0192516 | A1 * | 8/2010 | Olander | A01F 15/0715 53/118 |
| 2011/0179750 | A1 | 7/2011 | Smith et al. | |
| 2012/0240520 | A1 | 9/2012 | Gresset et al. | |
| 2016/0353665 | A1 * | 12/2016 | Hummel | A01F 15/071 |
| 2016/0355292 | A1 * | 12/2016 | Wigdahl | A01F 15/0715 |
| 2017/0057680 | A1 * | 3/2017 | Schlichting | G06K 7/10425 |
| 2022/0354059 | A1 * | 11/2022 | Weller | A01F 15/071 |

FOREIGN PATENT DOCUMENTS

| | | | | |
|---|---|---|---|---|
| EP | 2266386 | B1 * | 9/2014 | A01F 15/0715 |
| GB | 2440324 | A | 1/2008 | |
| WO | WO-2016140568 | A1 * | 9/2016 | A01F 15/0715 |
| WO | WO-2016140569 | A1 * | 9/2016 | A01F 15/0715 |

OTHER PUBLICATIONS

European Patent Office, International Search Report related to International Patent Application No. EP 22171411, mail date Oct. 20, 2022.

* cited by examiner

DISPLACEABLE WRAPPING MATERIAL SUPPLY UNIT FOR BALING APPARATUS

FIELD OF THE INVENTION

The present invention relates to a baling apparatus and in particular to a supply apparatus and a method for supplying a wrapping material to a wrapping inlet of a baling chamber of the baling apparatus.

BACKGROUND

It is known to construct a baling apparatus in which, in use, the baling apparatus is towed along a windrow or swath of crop to be baled. The crop is fed by way of a pick-up mechanism through a crop feed inlet into a baling chamber where a bale is formed. Prior to ejection from the baling chamber, the formed bale is bound or wrapped by a wrapping material. Such wrapping material often takes the form of a net or net-like material. However, such wrapping material may also take the form of a film.

It is known to construct a baling apparatus in which the wrapping material is stored in a reservoir. Supply rollers are arranged to draw the wrapping material from the reservoir and, under the influence of gravity, a free end of the wrapping material is introduced to a rotating feeder roller. The rotating feeder roller then introduces the free end of the wrapping material into a baling chamber wrapping material inlet where a leading edge becomes trapped between the bale to be wrapped and a number of endless belts defining a circumferential part of the baling chamber. Rotation of the bale within the baling chamber then causes the wrapping material to be drawn from the reservoir and to wrap the bale within the baling chamber. Once the bale has been wrapped a cutting apparatus located adjacent the wrapping material inlet acts to sever the wrapping material between the supply rollers and the feeder roller.

Such an arrangement has a number of problems. Crop fed into the baling chamber through the crop feed inlet may exit though the wrapper inlet interfering with a clean entry of the wrapping material into the wrapper inlet. Also, the rotation of the bale can create an air flow that disrupts movement of the leading edge of the wrapping material preventing the leading edge from reaching the rotating feeder roller either at all or in the desired fashion. Each of these results prevents wrapping of the bale within the baling chamber in the desired manner.

These problems present particular difficulties when seeking to introduce a leading edge of a wrapping film into the wrapper inlet. Typically to overcome these difficulties, the wrapping film is reduced in width and fed as a rope into the baling chamber and then allowed to broaden out. It will be understood that this means the leading portion of the wrapping film introduced into the baling chamber does not perform the function of wrapping the formed bale.

It is an advantage of the present invention that it seeks to address these problems.

SUMMARY OF THE INVENTION

According to a first aspect of the present invention, a wrapping material supply apparatus for supplying wrapping material to a wrapper inlet of a baling chamber, in which baling chamber a bale is to be wrapped with the wrapping material, wherein the wrapping material supply apparatus comprises a wrapping material supply unit displaceable between a baling position and a wrapping position by a first actuator, characterised in that the wrapping material supply apparatus further comprises a cutting apparatus located at a lower end of the wrapping material supply apparatus.

Preferably the cutting apparatus is displaceable about a lower end of the wrapping material supply apparatus.

Preferably the cutting apparatus comprises a pivoting frame including a cutting element moveable between a first position allowing free passage of wrapping material through the wrapping supply apparatus and a second position in which the cutting element severs wrapping material passing through the wrapping supply apparatus.

Preferably the wrapping material supply apparatus further comprises a second actuator to displace the pivoting frame between the first and second positions.

Preferably the second actuator is operated independently of the first actuator. This has as an advantage that movement of the wrapping material supply apparatus between the baling position and the wrapping position is independent of the movement of the cutting apparatus.

According to a second aspect of the present invention, a baler comprises a wrapping material supply apparatus according to the first aspect of the present invention.

According to a third aspect of the present invention, a baling arrangement comprises a baler according to the second aspect of the present invention and an agricultural vehicle.

Preferably, the baling arrangement further comprises a bale size sensor, a bale wrapping sensor and an electronic control unit.

According to a fourth aspect of the present invention, a method of operation of a baling arrangement according to the fourth aspect of the invention comprises the steps of: determining when a bale has been sufficiently wrapped and causing the cutting apparatus to be operated.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

Round balers for creating cylindrical bales of agricultural material (hay, straw, silage or other suitable agricultural material) by means of a variable diameter round baling chamber are known in the art. The invention is also applicable to a baling apparatus in which a fixed diameter round baling chamber is provided.

Figure 1:
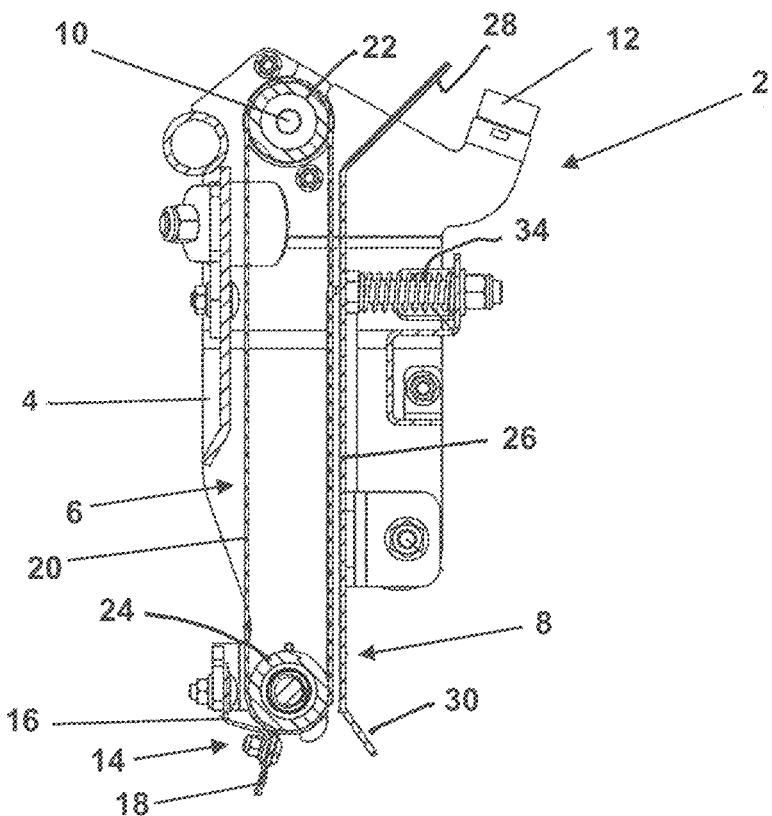
FIG. 1 shows a side sectional view of a wrapping material supply apparatus.
Figure 2:
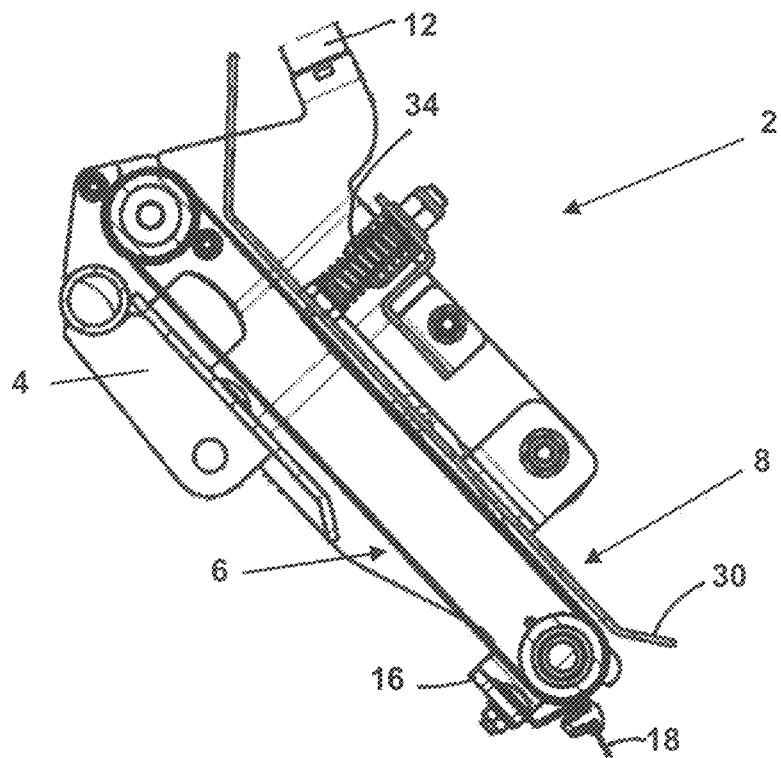
FIG. 2 shows a side sectional view of the supply apparatus of FIG. 1 in a wrapping position.

FIGS. 1 and 2 show a schematic side sectional view of a supply apparatus for supplying wrapping material towards a wrapper inlet of a baling chamber.

The wrapping material supply unit 2 takes the form of a pivotal elongate apparatus with a channel through which a wrapping material may be supplied. FIG. 1 corresponds to a baling position of the wrapping material supply unit 2 and FIG. 2 to a wrapping position of the wrapping material supply unit 2. An actuator (not shown) is provided to control the pivoting movement of the wrapping material supply unit. The actuator may take any suitable form.

In this embodiment, the wrapping material supply unit 2 takes the form of a frame element 4 on which a conveyor unit 6 and an adjacent biased planar element 8 are mounted.

The frame element 4 is mounted to the baling apparatus (not shown) about a pivoting shaft 10. The frame element 4 is further provided with a first stop element 12 mounted at an upper end and a guidance member 14 located adjacent a lower end of the conveyor unit 6. The guidance member 14 comprises a flexible member 18 secured to the frame element 4 by a fixed bracket 16. The flexible member 18 is secured to the fixed bracket 16 by a suitable fastener. The flexible member 18 may be formed of any suitable material.

The conveyor unit comprises an endless belt 20 adapted to be driven at a first end about a first roller 22 having a first axis. The first axis is concentric with the axis of the pivoting shaft 10. The second end of the conveyor unit is provided with a second roller 24, an idler roller adapted for rotation about a second axis.

Figure 3:
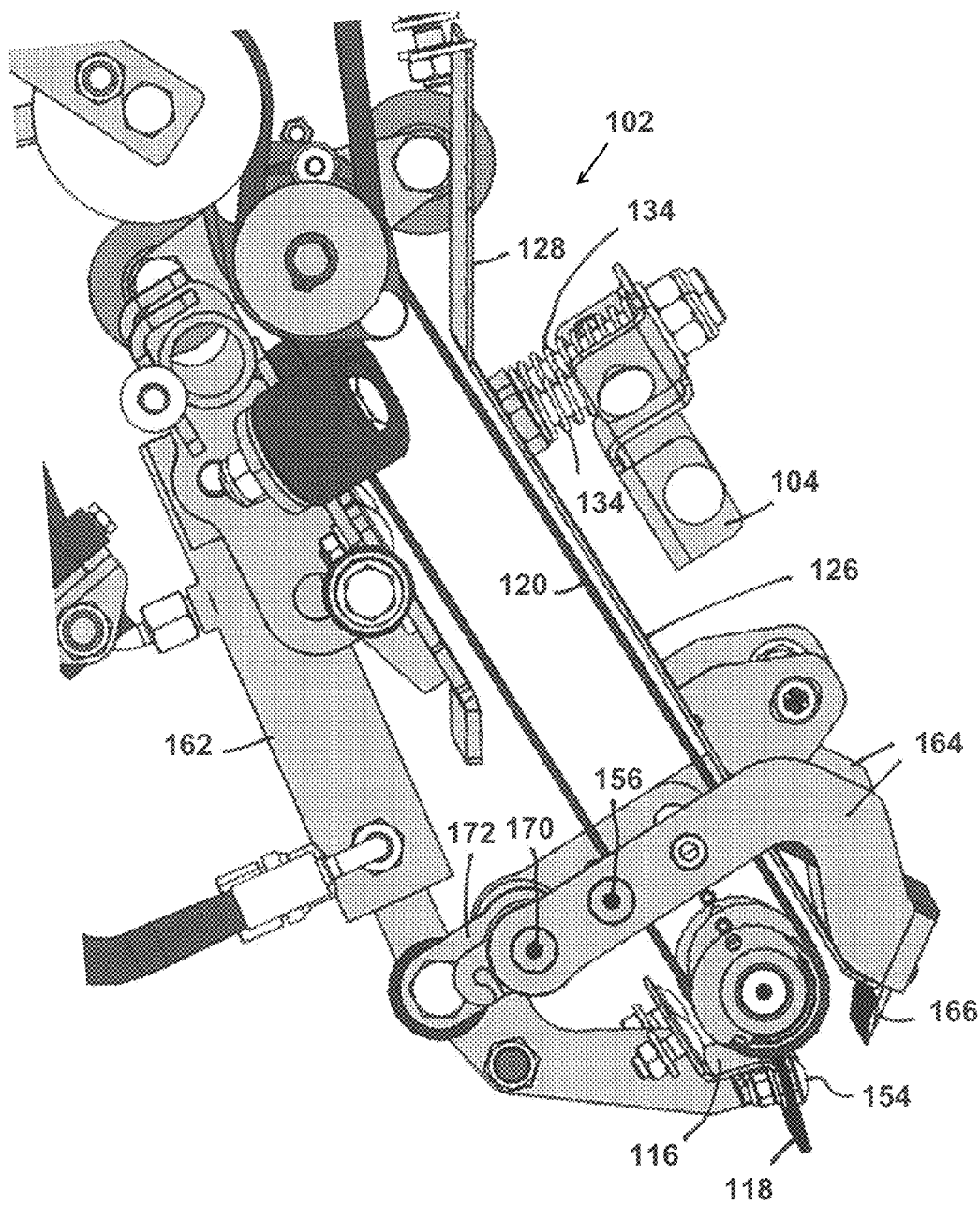
FIG. 3 shows a perspective sectional view of elements of a wrapping material supply apparatus similar to that shown in FIGS. 1 and 2 modified in accordance with the present invention.
Figure 4:
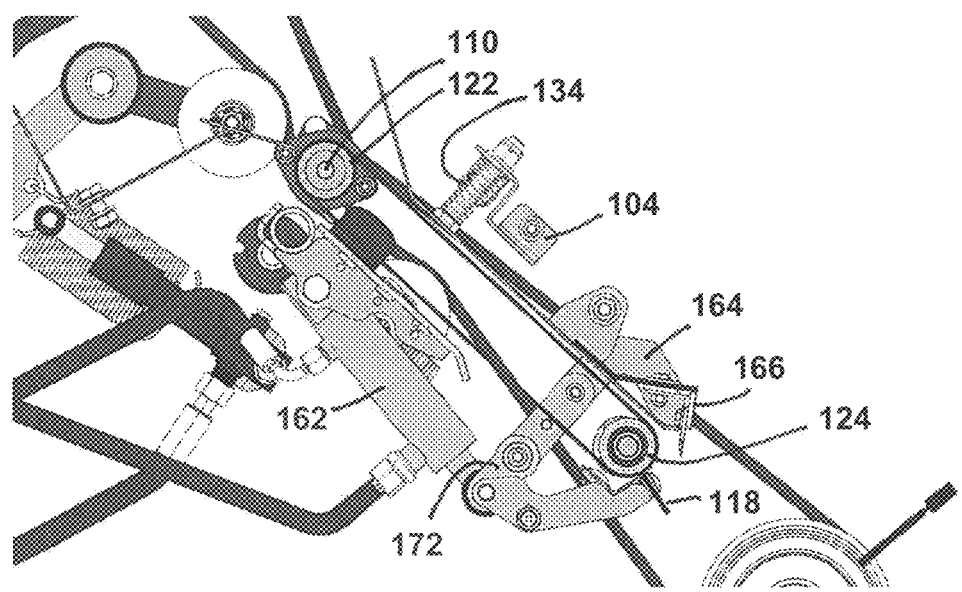
FIG. 4 shows a further perspective sectional view of elements of the apparatus of FIG. 3.
Figure 5:
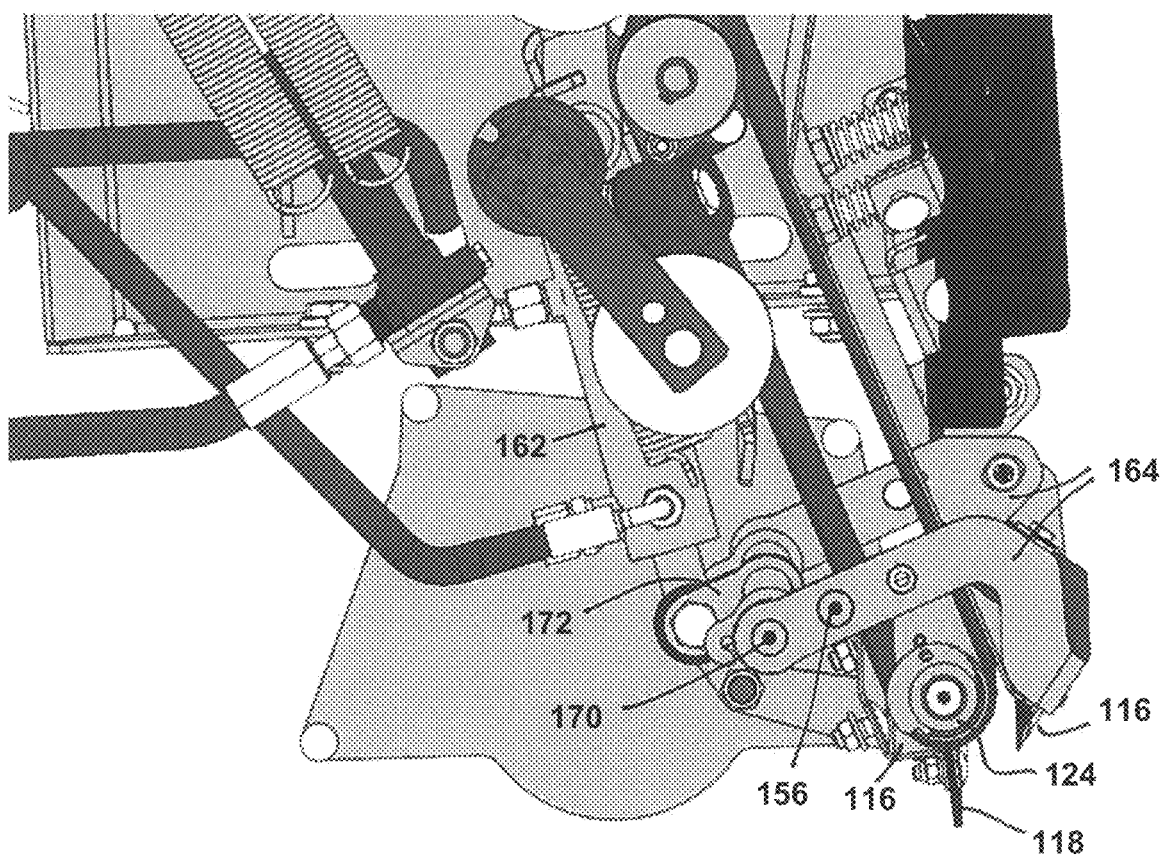
FIG. 5 shows a still further perspective sectional view of elements of the apparatus of FIG. 3.
Figure 6:
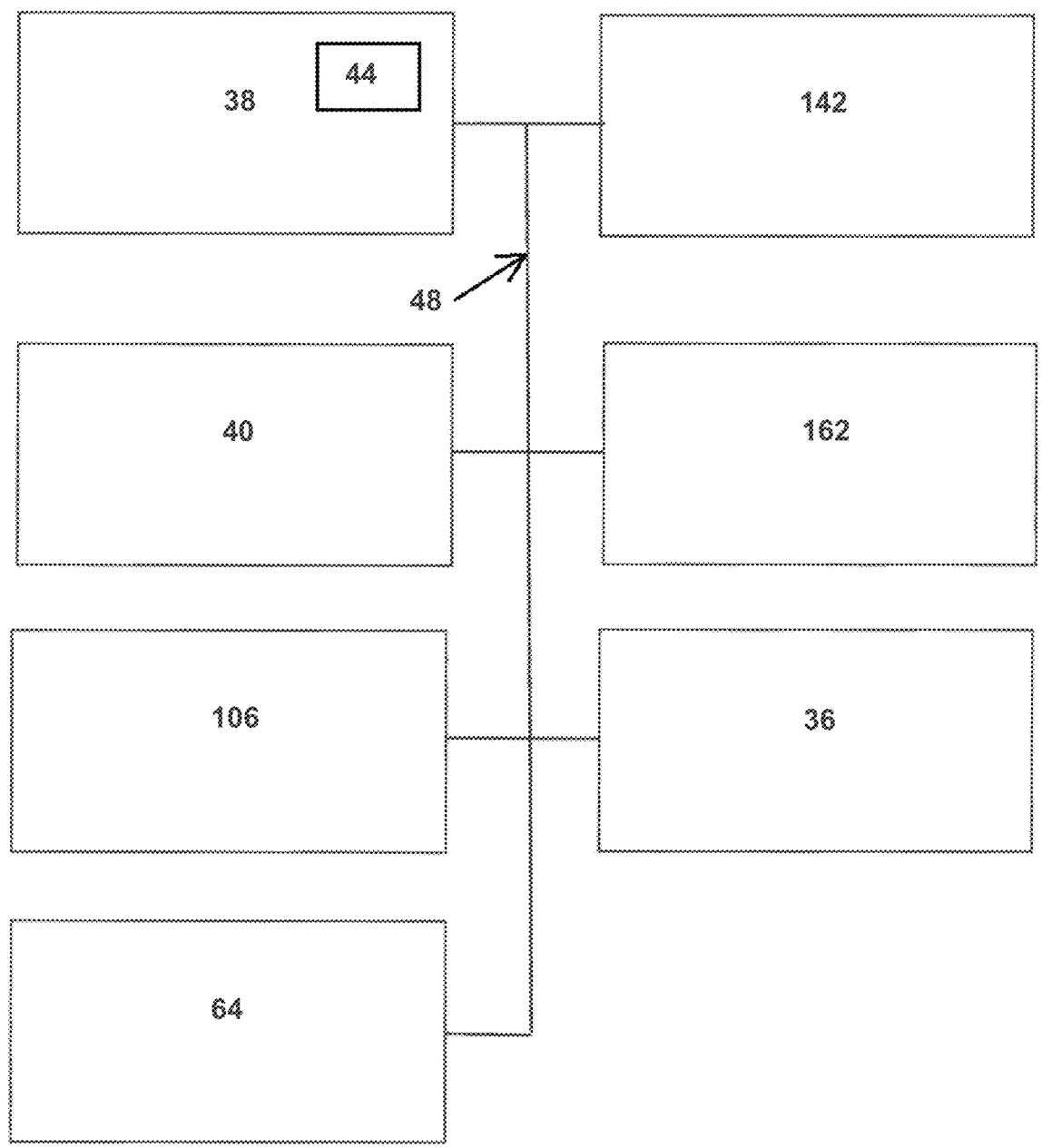
FIG. 6 shows a schematic view of elements of the present invention.

The biased planar element 8 comprises a central generally planar portion 26 provided at each end with a guidance portion 28,30, each guidance portion being angled away from the central planar portion 26 and the conveyor rollers 22,24. In use the central planar portion 26 extends substantially parallel to the endless belt 20 of the conveyor unit 6 and extends substantially alongside one side of the conveyor unit 6. The central planar portion 26 is fixedly secured to the frame element 4 towards a lower end of the central planar portion 26, for example by a suitable fastening arrangement. An upper end of the central planar portion 26 is located adjacent a biasing element. In the illustrated embodiment the biasing element comprises a spring element 34 mounted between the frame element 4 and the central planar portion 26. In the illustrated embodiment, the spring element 34 comprises a pair of laterally spaced helical springs (one of which is shown in the sectional views of FIGS. 1, 2 and 4; both springs may be seen in FIGS. 3 and 5 in relation to the inventive embodiment).

An electronic control unit 38 is provided to control operation of the electronic components. The electronic control unit 38 may conveniently comprise a single processor located on the baler or its functions may be split between a first processor located on the baler and one or more additional processors located on an agricultural vehicle towing the baler, the additional processor(s) being in electronic communication with the first processor.

The electronic control unit 38 has access to a memory unit 44. The memory unit 44 may take any suitable form and is in electronic communication with the electronic control unit 38. The memory unit 44 is adapted to store, in any suitable manner such as a database or look up table, reference values as may be required, for example stored values corresponding to a desired size of bale.

Conveniently the signals between the electronic components are provided by way of a suitable data communication network 48 such as one compliant with the ISOBUS standard (a network in conformance to ISO 11783).

One or more bale size sensors 40 are provided in electronic communication with the electronic control unit 38 to send signals corresponding to the size of the bale being formed in the baling chamber to the electronic control unit 38.

A first actuator 42 adapted to control the pivoting movement of the wrapping material supply unit is also in electronic communication with the electronic control unit 38.

In use a free end of a new roll of wrapping material is fed between the conveyor unit 6 and the adjacent biased planar element, the upper angled portion 28 assisting in the direction of the free end of the wrapping material between the conveyor unit 6 and the adjacent biased planar element 8. Supply rollers 36 may be actuated to feed the free end of the wrapping material into the channel until the free end of the wrapping material extends beyond the end of the conveyor unit 6 and over the flexible member 18.

Alternatively the supply rollers 36 and the conveyor unit 6 may be operated together such that the wrapping material is drawn into the channel between the conveyor unit 6 and the planar element 8.

In the baling position (FIG. 1), the wrapping material supply unit 2 is pivoted away from a wrapping material inlet of a baling chamber. Once the formed bale is of the required size, the wrapping material supply unit 6 is pivoted about the upper shaft 10 into the wrapping position (FIG. 2) so that the flexible member 18 and the lower guidance portion 30 are located adjacent the wrapping material inlet.

This is conveniently achieved using the electronic control unit 38 in communication with the one or more bale size sensors 40 and the first actuator 42. The electronic control unit 38 has access to a memory unit 44 in which are stored values corresponding to a desired size of bale. Once the desired bale size is sensed by the bale size sensors 40, the electronic control unit 38 causes operation of the first actuator 42.

The flexible member 18 and the lower guidance portion 30 together form a conduit to direct the free end of the wrapping material toward the wrapping material inlet. The supply rollers 36 and the first roller 22 of the conveyor unit 36 are then driven to feed and direct a free end of the wrapping material onto an upper driven conveyor roller (forming a lower part of the wrapping material inlet) so that the free end of the wrapping material is directed into the wrapping material inlet.

The flexible member 18 ensures that the free end of the wrapping material is pressed into contact against the driven conveyor roller to ensure that the driven conveyor roller acts to transport the free end of the wrapping material through the wrapping material inlet.

Once in the baling chamber the free end of the wrapping material becomes trapped between the formed bale and the endless belts (or between the formed bale and the rollers defining a fixed diameter baling chamber). The wrapping material is then pulled by the formed bale from the reservoir until the formed bale is considered to be fully wrapped. The first roller 22 of the conveyor unit is conveniently provided with a clutch arrangement allowing the wrapping material to be drawn past the conveyor unit 6 at a greater speed than provided for by the drive of the first roller 22. As the wrapping material is drawn into the baling chamber, the wrapping material is placed into tension and stretched. In the illustrated embodiments, during wrapping some of this tension is taken up by the central planar portion pushing back against the springs 34.

Once the formed bale has been wrapped, a cutting apparatus acts to sever the wrapping material between the supply rollers and the wrapping material supply unit. Once a trailing end of the severed material has been drawn into the baling chamber around the formed bale, rotation of the bale may be ceased. The wrapping material supply unit 2 can then be returned to the baling position under the operation of the electronic control unit 38 as the wrapped formed bale is ejected from the baling chamber.

In the invention illustrated in FIGS. 3 to 6, the wrapping material supply unit 102 has been modified to incorporate a cutting apparatus.

The wrapping material supply unit 102 includes a conveyor unit 106 and an adjacent biased planar element 108.

The conveyor unit 106 is provided with an upper roller adapted to be driven about a shaft 110, a lower roller 124 and an endless belt 120 running between the first and second rollers. The wrapping material supply unit 102 is adapted to be pivoted about the shaft 110 under the action of a first actuator 142 between a baling position and a wrapping position.

The biased planar element 108 includes comprises a central generally planar portion 126 provided at each end with a guidance portion 128,130, each guidance portion being angled away from the central planar portion 126 and the conveyor rollers 122,124. In use the central planar portion 126 extends substantially parallel to the endless belt 120 of the conveyor unit 106 and extends substantially alongside one side of the conveyor unit 106. As in the previous embodiment, an upper end of the central planar portion 126 is located adjacent a biasing element. The biasing element comprises a spring element 134 mounted between the frame element 104 and the central planar portion 126. In the illustrated embodiment, the spring element 134 comprises a pair of laterally spaced helical springs.

A flexible member 118 is mounted to a bracket 116 extending across the lower end of the endless belt 120. The fixed bracket 116 is connected to a frame of the baler.

The cutting apparatus comprises a pivoting frame mounted to the frame of the baler. The frame extends around a lower end of the wrapping material supply unit 102. The pivoting frame comprises substantially L-shaped side elements 164 comprising a longer limb and a short limb. Distal ends of the shorter limb are connected by a cutting element 166 extending therebetween. In the position shown in FIGS. 3 to 5 the cutting element 166 is located to pass over the lower ends of the central planar portion 126. Distal ends of the longer limbs are connected by a shaft 170 mounted therebetween. The shaft 170 extends beneath the conveyor unit 106. The shaft 170 is provided with a radially extending connecting piece 172. The L-shaped side elements 164 are each mounted to the baler frame about a pivot axis 156. A distal end of the radially extending connecting piece is connected to a second actuator 162. The second actuator 162 is in electronic communication with the electronic control unit 38.

By comparing signals from a bale size sensor 40 with reference values stored in the memory unit 44, the electronic control unit 38 can determine when the bale being formed in the baling chamber is ready to be wrapped. Once the determination has been made the first actuator 142 is operated and the wrapping material supply unit 102 is pivoted from a baling position to a wrapping position.

The electronic control unit 38 then causes the supply rollers 36 and the conveyor unit 106 to operate in order to introduce a leading edge of wrapping material into the baling chamber. The wrapping material is then drawn into the baling chamber to wrap the bale.

A signals from a sensor 64 referenced against values stored in the memory unit 44 enable the electronic control unit 38 to determine when sufficient wrapping material has been dispensed from the reservoir, and so to cause the second actuator 162 to be operated. The sensor 64 may detect a number of revolutions of the baling chamber since the wrapping material was introduced into the baling chamber, the time elapsed since the supply rollers were actuated to introduce the wrapping material to the baling chamber or another measure to determine that the sufficient wrapping material has been dispensed.

Operation of the second actuator 162 causes movement of the pivoting frame of the cutting apparatus about the pivot axis 156. This moves the cutting element 166 down across the path of the wrapping material and towards the flexible element 118 causing the wrapping material to be severed.

The electronic control unit 138 then causes the first actuator 142 to operate to return the wrapping material supply unit 102 from the wrapping position to the baling position.

While the invention is intended to have particular advantages where the wrapping material is a wrapping film, the apparatus is also suitable for use with other forms of wrapping material, for example netwrap.

From reading the present disclosure, other modifications will be apparent to persons skilled in the art. Such modifications may involve other features which are already known in the field of round balers and component parts therefore and which may be used instead of or in addition to features already described herein.

The invention claimed is:

1. A wrapping material supply apparatus for supplying wrapping material to a wrapper inlet of a baling chamber, in which baling chamber a bale is to be wrapped with the wrapping material, comprising:

a wrapping material supply unit comprising a channel between a planar element and an endless belt, wherein the wrapping material supply unit is displaceable between a baling position and a wrapping position by a first actuator; and a cutting apparatus located at a lower end of the wrapping material supply apparatus.

2. The wrapping material supply apparatus of claim 1, wherein the cutting apparatus is displaceable about the lower end of the wrapping material supply apparatus.

3. The wrapping material supply apparatus of claim 1, wherein the cutting apparatus comprises a pivoting frame comprising a cutting element moveable between a first position allowing free passage of wrapping material through the wrapping supply apparatus and a second position in which the cutting element severs wrapping material passing through the wrapping supply apparatus.

4. The wrapping material supply apparatus of claim 3, further comprising a second actuator to displace the pivoting frame between the first and second positions.

5. A baler comprising the wrapping material supply apparatus of claim 1.

6. A baling arrangement comprising the baler of claim 5 and an agricultural vehicle.

7. The baling arrangement of claim 6, further comprising a bale size sensor, a bale wrapping sensor and an electronic control unit.

8. The baling arrangement of claim 1, wherein the endless belt is driven at a first end about a first roller and a second end of the endless belt has a second roller, and the planar element comprises a central planar portion, wherein the central planar portion extends alongside and parallel to a portion of the endless belt between the first and second rollers.

9. The baling arrangement of claim 8, wherein the planer element comprises a guidance portion at an upper end and a lower end of the planer element, wherein each guidance portion is angled away from the central planar portion and the and the first and second rollers.

10. A wrapping material supply apparatus for supplying wrapping material to a wrapper inlet of a baling chamber, in which baling chamber a bale is to be wrapped with the wrapping material, comprising:

a wrapping material supply unit comprising a channel between a planar element and an endless belt, wherein the wrapping material supply unit is displaceable between a baling position and a wrapping position by a first actuator;

a cutting apparatus located at a lower end of the wrapping material supply apparatus, wherein the cutting apparatus comprises a pivoting frame comprising a cutting element moveable between a first position allowing free passage of wrapping material through the wrapping supply apparatus and a second position in which the cutting element severs wrapping material passing through the wrapping supply apparatus; and a second actuator to displace the pivoting frame between the first and second positions, wherein the second actuator is operated independently of the first actuator.

11. The baling arrangement of claim 10, wherein the endless belt is driven at a first end about a first roller and a second end of the endless belt has a second roller, and the planar element comprises a central planar portion, wherein the central planar portion extends alongside and parallel to a portion of the endless belt between the first and second rollers.

12. The baling arrangement of claim 11, wherein the planer element comprises a guidance portion at an upper end and a lower end of the planer element, wherein each guidance portion is angled away from the central planar portion and the and the first and second rollers.

* * * * *